(12) United States Patent
Munemura et al.

(10) Patent No.: US 12,429,080 B2
(45) Date of Patent: Sep. 30, 2025

(54) FRICTION JOINING ELEMENT

(71) Applicant: JFE STEEL CORPORATION, Tokyo (JP)

(72) Inventors: Naoaki Munemura, Tokyo (JP); Hiroshi Matsuda, Tokyo (JP); Yoshiaki Murakami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 101 days.

(21) Appl. No.: 18/282,898

(22) PCT Filed: Mar. 17, 2022

(86) PCT No.: PCT/JP2022/012435
§ 371 (c)(1),
(2) Date: Sep. 19, 2023

(87) PCT Pub. No.: WO2022/202631
PCT Pub. Date: Sep. 29, 2022

(65) Prior Publication Data
US 2024/0167492 A1    May 23, 2024

(30) Foreign Application Priority Data
Mar. 23, 2021    (JP) .................. 2021-048713

(51) Int. Cl.
*F16B 5/08*    (2006.01)
*B23K 20/12*    (2006.01)
(Continued)

(52) U.S. Cl.
CPC ............... *F16B 5/08* (2013.01); *B23K 20/12* (2013.01); *F16B 33/06* (2013.01); *F16B 35/06* (2013.01)

(58) Field of Classification Search
None
See application file for complete search history.

(56) References Cited

U.S. PATENT DOCUMENTS

| | | | |
|---|---|---|---|
| 7,942,306 B2 * | 5/2011 | Burford | B23K 20/1255 228/8 |
| 2002/0125297 A1 | 9/2002 | Stol et al. | |

(Continued)

FOREIGN PATENT DOCUMENTS

| | | |
|---|---|---|
| DE | 102013220863 A1 | 4/2015 |
| DE | 102016205924 A1 | 10/2017 |

(Continued)

OTHER PUBLICATIONS

Dec. 6, 2024 Extended Search Report issued in European Patent Application No. 22775419.9.

(Continued)

*Primary Examiner* — Devang R Patel
(74) *Attorney, Agent, or Firm* — Oliff PLC

(57) ABSTRACT

A friction joining element for mechanically joining a sheet set prepared by stacking two or more metal sheets including a high strength steel sheet as an upper sheet. The friction joining element includes a mandrel having an overall length adjusted to be equal to or less than the total thickness of the sheet set, and a collar disposed at an upper portion of the mandrel. The friction joining element has a screw thread on a side surface of a head-side portion of the mandrel.

2 Claims, 2 Drawing Sheets

(51) Int. Cl.
*F16B 33/06* (2006.01)
*F16B 35/06* (2006.01)

(56) References Cited

U.S. PATENT DOCUMENTS

| | | |
|---|---|---|
| 2013/0094896 A1 | 4/2013 | Christ et al. |
| 2016/0091009 A1 | 3/2016 | Wang et al. |
| 2017/0291215 A1 | 10/2017 | Memili |
| 2018/0021883 A1 | 1/2018 | Werkmeister et al. |
| 2020/0300283 A1 | 9/2020 | Fröhlich et al. |
| 2021/0086254 A1* | 3/2021 | Christ ................ B23K 20/1295 |
| 2021/0283712 A1 | 9/2021 | Reis et al. |

FOREIGN PATENT DOCUMENTS

| | | |
|---|---|---|
| JP | 2013-534994 A | 9/2013 |
| JP | 2018-504281 A | 2/2018 |
| JP | 2019-532228 A | 11/2019 |
| JP | 2020-159488 A | 10/2020 |
| JP | 2021-504147 A | 2/2021 |
| WO | 2019158661 A1 | 8/2019 |

OTHER PUBLICATIONS

Dec. 28, 2022 Office Action issued in Japanese Patent Application No. 2022-537442.

Jun. 7, 2022 International Search Report issued in International Patent Application No. PCT/JP2022/012435.

Feb. 26, 2025 Office Action issued in Korean Patent Application No. 10-2023-7030712.

* cited by examiner

FRICTION JOINING ELEMENT

TECHNICAL FIELD

This application relates to a friction joining element. The friction joining element is rotated at high speed and pressed into a sheet set including two or more metal sheets including a high strength steel sheet as an upper sheet to thereby join the sheet set by friction joining.

BACKGROUND

In recent years, high strength steel sheets called ultra-high strength steel sheets are increasingly used in the automobile industry in order to achieve simultaneously safety and a reduction in environmental loads by reducing the weight of automobile bodies, and further, steel sheets having higher strength and higher workability are expected to be developed in the future. However, one problem that occurs when fusion bonding such as resistance spot welding is applied to steel sheets with increased strength and workability is a reduction in joint strength due to embrittlement of solidification microstructures. Therefore, attention is given to a non-fusion bonding technique capable of bonding high strength steel sheets together.

One example of the non-fusion bonding technique that has been contemplated is FEW (Friction Element Welding) described in Reference Literature 1. In the FEW technique, an element rotated at high speed is pressed into a sheet set to join the sheet set. For example, a method proposed and disclosed in Patent Literature 1 has been used for the element.

[Reference Literature 1] Jamie D. Skovron, Brandt J. Ruszkiewicz, and Laine Mears, "INVESTIGATION OF THE CLEANING AND WELDING STEPS FROM THE FRICTION ELEMENT WELDING PROCESS" (ASME 2017 12th International Manufacturing Science and Engineering Conference collocated with the JSME/ASME 2017 6th International Conference on Materials and Processing, Jun. 4-8, 2017, Los Angeles, California, USA)

In the technique disclosed in Patent Literature 1, the forward end of a mandrel portion of a joining element (element) is connected to a lower sheet by friction welding. Then an upper sheet material plastically deformed and extruded in the joining process is held by a collar of a head portion of the element, and joining of the sheet set is thereby achieved.

CITATION LIST

Patent Literature

PTL 1: Japanese Unexamined Patent Application Publication (Translation of PCT Application) No. 2013-534994

SUMMARY

Technical Problem

It is stated in Patent Literature 1 that, for example, an aluminum sheet is used as the upper sheet included in the sheet set and a steel sheet is used as the lower sheet in the sheet set. However, with the technique described in Patent Literature 1, when a steel sheet is used as the upper sheet, the plastic deformation of the upper sheet is insufficient, and therefore the collar of the joining element (element) does not come into contact with the upper sheet, so that the element cannot fasten the upper sheet sufficiently. Therefore, it may be difficult to join the sheet set in some cases.

The disclosed embodiments have been made to solve the foregoing problem, and it is an object to provide a friction joining element capable of mechanically joining a sheet set including two or more stacked metal sheets including a high strength steel sheet as an upper sheet.

Solution to Problem

The inventors have conducted extensive studies to solve the foregoing problem. Then the inventors have found that, by specially designing the shape of the side surface of the friction joining element, a sheet set including two or more metal sheets can be joined using mechanical joining even when the sheet set is, in particular, a sheet set including two or more metal sheets including, as an upper sheet, a steel sheet containing ultra-high strength steel (high strength steel sheet).

Specifically, a screw thread is formed on the side surface of the mandrel of the friction joining element, and this allows the friction joining element to engage the upper sheet. In this manner, even when a high strength steel sheet is used as the upper sheet of the sheet set, the friction joining element can firmly fasten the upper sheet, and the sheet set can be joined together using mechanical joining.

The disclosed embodiments have been made on the basis of the above findings and completed as a result of further studies. The disclosed embodiments are summarized as follows.

[1] A friction joining element for mechanically joining a sheet set prepared by stacking two or more metal sheets including a high strength steel sheet as an upper sheet, the friction joining element including: a mandrel having an overall length adjusted to be equal to or less than the total thickness of the sheet set; and a collar disposed at an upper portion of the mandrel, wherein the friction joining element has a screw thread on a side surface of a head-side portion of the mandrel.

[2] The friction joining element according to [1], wherein a coating layer is provided on a surface of the screw thread.

[3] The friction joining element according to [1] or [2], wherein the number of ridges of the screw thread in a side surface region of the mandrel is from 2 to 20 inclusive, and wherein the distance between adjacent ridges of the screw thread is in the range of 100 to 1000 μm.

Advantageous Effects

In the disclosed embodiments, the friction joining element and a sheet set are fastened together by screwing. Therefore, even when the sheet set includes two or more metal sheets including a high strength steel sheet as an upper sheet, the sheet set can be joined by mechanical joining. In this manner, a mechanically joined joint having good joint performance can be provided.

DETAILED DESCRIPTION

The disclosed embodiments will next be described in detail.

First, the technological idea of the disclosed embodiments will be described.

Figure 1:
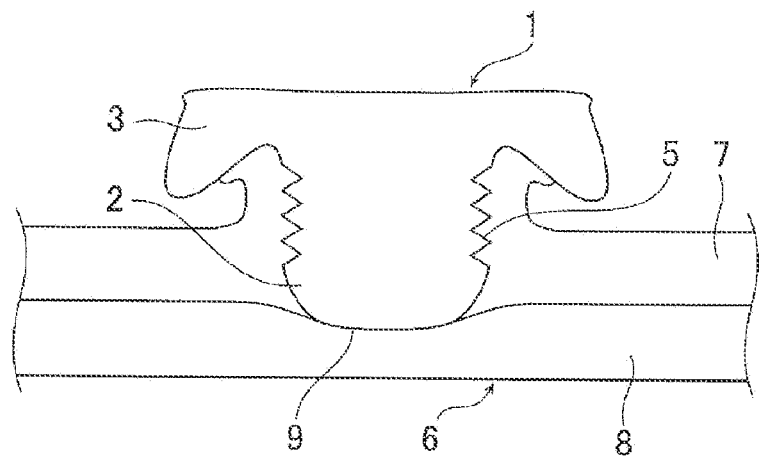
FIG. 1 is a schematical illustration showing a joint state obtained using the friction joining element according to an embodiment.
Figure 3:
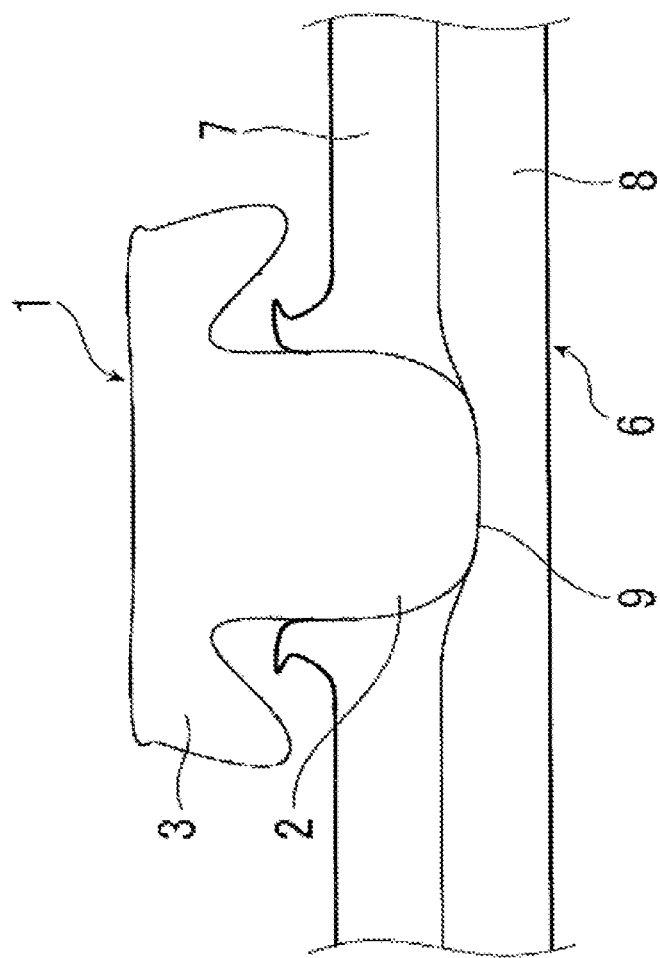
FIG. 3 is a schematic illustration showing a joint state obtained using a conventional element.

FIGS. 1 and 3 are schematic illustrations each showing a state in which a sheet set including two metal sheets is joined using an element. FIG. 3 shows a conventional element, and the conventional element has no screw thread on the side surface of its mandrel. FIG. 1 shows the friction joining element of the disclosed embodiments (which may be hereinafter referred to as an "element"), and the friction joining element of the disclosed embodiments has a screw thread on the side surface of its mandrel. In FIGS. 1 and 3, the same components are denoted by the same numerals. In each of FIGS. 1 and 3, numeral 1 denotes an element, and numeral 2 denotes a mandrel. Numeral 3 denotes a collar, and numeral 5 denotes a screw thread. Numeral 6 denotes a sheet set. Numeral 7 denotes an upper sheet, and numeral 8 denotes a lower sheet. Numeral 9 denotes the joint interface between the element and the lower sheet.

FIGS. 1 and 3 each show a state in which a sheet set 6 including two sheet-shaped members (an upper sheet 7 and a lower sheet 8) and an element 1 are joined together. The upper sheet 7 is the uppermost one of the stacked metal sheets forming the sheet set 6, and the lower sheet 8 is the lowermost one of the stacked metal sheets forming the sheet set 6. The upper sheet 7 is a high strength steel sheet containing ultra-high strength steel. In the disclosed embodiments, the term "high strength" means that the tensile strength is 590 MPa or more. The tensile strength of the steel sheet is preferably 980 MPa or more and is preferably 1470 MPa or less.

As shown in FIGS. 1 and 3, to join the sheet set 6 using the element 1, first, a joining apparatus (not shown) is used. Specifically, the element 1 is rotated and brought into contact with the upper sheet 7 that is one of the sheet-shaped members, and a pressing force is applied to the element 1 to press the element 1 into the upper sheet 7. In this manner, the upper sheet 7 that is one of the sheet-shaped members is plasticized by the frictional heat, and the mandrel 2 enters the upper sheet 7 that is one of the sheet-shaped members. The element 1 pierces through the upper sheet 7 that is one of the sheet-shaped members and comes into contact with the lower sheet 8 that is another of the sheet-shaped members, and then a friction joining process is started in the element 1 and the lower sheet 8.

In the case of the conventional element 1 shown in FIG. 3, the joint between the upper sheet 7 and the lower sheet 8 is achieved by the element 1. However, when a cross section of the joint portion is observed, a gap is present between the collar 3 of the element 1 and the upper sheet 7, and therefore the joint state is insufficient. This is because of the following reason. Since the metal sheet such as the steel sheet is less easily plastically deformed than a light metal sheet such as an aluminum sheet, the gap between the collar portion of the element and the upper sheet is not fully filled with the plastically deformed metal.

However, in the case of the element 1 of the disclosed embodiments shown in FIG. 1, the screw thread 5 continuously formed in the length direction of the mandrel 2 is provided on the side surface of the mandrel 2. In this manner, as the mandrel 2 enters the upper sheet 7 that is one of the sheet-shaped members, the screw thread 5 engages the upper sheet 7 that is one of the sheet-shaped members, and the upper sheet 7 that is one of the sheet-shaped members is fastened to the mandrel 2. Therefore, the upper sheet 7 is plastically deformed sufficiently, and the collar 3 of the element 1 and the upper sheet 7 come into contact with each other.

Moreover, the mandrel 2 pierces through the upper sheet 7 that is one of the sheet-shaped members and enters the lower sheet 8, and the forward end of the mandrel 2 is connected to the lower sheet 8 by friction joining. In this case, the material of the upper sheet 7 is plastically deformed and extruded in the joining process, and the extruded material is held by the collar 3 disposed at the upper portion of the mandrel 2. Therefore, the mechanical joint between the upper sheet 7 that is one of the sheet-shaped members and the lower sheet 8 that is the other one of the sheet-shaped members can be achieved by the element 1. When a cross section of the joint portion obtained by the element of the disclosed embodiments is observed, the upper sheet 7 and the screw thread 5 engage each other as shown in FIG. 1. Therefore, even when the upper sheet 7 is a high strength steel sheet, a sound joint state is obtained.

Next, referring to FIG. 2, the element of the disclosed embodiments will be described.

The element of the disclosed embodiments is used to mechanically join a sheet set prepared by stacking two or more metal sheets including a high strength steel sheet as an upper sheet.

Figure 2:
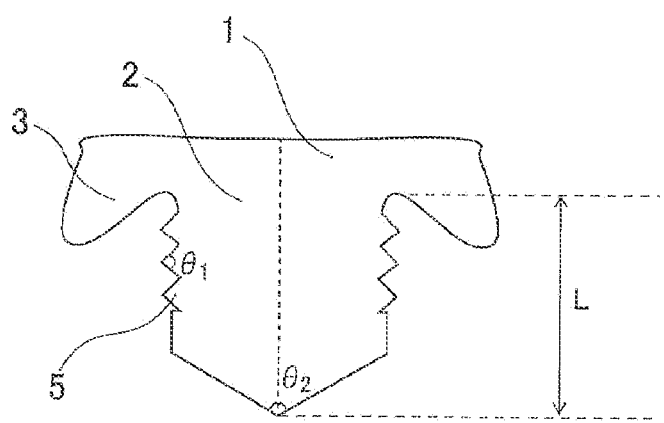
FIG. 2 is a schematic illustration showing an embodiment of the friction joining element according to an embodiment.

FIG. 2 is a schematic illustration showing one embodiment of the element of the disclosed embodiments. As shown in FIG. 2, the element 1 of the disclosed embodiments includes the mandrel 2 and the collar 3, and the screw thread 5 is provided on the side surface of the mandrel 2. The screw thread 5 includes a plurality of ridges formed continuously in the length direction of the mandrel. The element 1 is rotated at high speed, pressed into the sheet set, and connected to the sheet set. As described above, the element 1 is joined to the upper sheet of the sheet set through the screw thread and frictionally joined to the lower sheet of the sheet set at the forward end of the mandrel.

The mandrel 2 is disposed at the axial center of the element 1 and formed into a cylindrical shape. The forward end of the mandrel 2 is formed into a flat shape, a tapered shape inclined such that its forward end portion protrudes forward, a drill shape having cutting edges, etc.

The overall length L of the mandrel 2 is adjusted to be equal to or less than the total thickness of the sheet set (the total thickness of the sheets in the sheet set 6). Specifically, the upper limit of the overall length of the mandrel 2 is the same as the total thickness of the sheet set 6 or is a value obtained by subtracting the thickness of the lowermost metal sheet (lowermost layer) in the sheet set (for example, the lower sheet 8 in the example shown in FIG. 1) from the total thickness of the sheet set 6. It is only necessary that the overall length L of the mandrel 2 be such that the forward end of the mandrel can be frictionally jointed to the lower sheet 8.

The overall length L (mm) of the mandrel 2 is preferably 10 mm or less and more preferably 8 mm or less. The overall length L of the mandrel 2 is preferably 1 mm or more.

The screw thread 5 is provided on the side surface of the mandrel 2. The screw thread 5 is provided on the side surface of a head-side portion (upper-side portion) of the mandrel 2 (i.e., a head-side portion of the element 1). In the example shown in FIG. 2, three ridges are provided around the head-side portion of the mandrel 2. In the disclosed embodiments, it is important that the screw thread 5 be disposed on the side surface of the mandrel 2. In this case, as described above, the screw thread 5 and the upper sheet 7 that is one of the sheet-shaped members engage each other, and the effect of fastening the upper sheet 7 to the mandrel 2 is obtained. Therefore, so long as this effect is obtained, the screw thread can have any shape. The number of ridges of the screw thread can be appropriately adjusted in consideration of the material and strength of the metal sheets forming the sheet set 6, the total number of metal sheet forming the sheet set, etc.

The surface of the screw thread 5 may be subjected to coating treatment to form a coating layer. In this case, wear of the screw thread 5 that occurs when the screw thread 5 enters the upper sheet 7 that is one of the sheet-shaped members can be reduced. Therefore, the element 1 and the upper sheet 7 that is one of the sheet-shaped members can more firmly engage each other.

No particular constraint is imposed on the coating layer so long as it has the desired performance as a wear resistance material. Examples of the coating layer include coating layers formed of WC, TiN, and other ceramics, heat-resistant coating layers, and coating layers formed by hardening treatment such as nitriding. The thickness of the coating layer may be appropriately adjusted according to the desired performance.

The collar 3 is disposed at a portion on top of the mandrel 2, i.e., a head portion of the element 1. In this manner, the material of the upper sheet 7 extruded due to the plastic flow during the joining process can be held by the collar 3. Specifically, the collar 3 may be formed into, for example, a wafer shape, a truss shape, etc.

The element 1 of the disclosed embodiments having the structure described above is rotated and pressed into the sheet set 6 as shown in, for example, FIG. 1, and the metal sheets (the upper sheet 7 and the lower sheet 8) are plasticized by the frictional heat generated during this process. Then the upper sheet 7 of the sheet set 6 and the screw thread 5 formed on the side surface of the mandrel 2 engage each other and fastened together, and the lower sheet 8 of the sheet set 6 is frictionally joined to the forward end of the mandrel 2, so that a joint can be obtained by mechanical joining. With the element 1 of the disclosed embodiments, the effect of strengthening the fastening of the sheet-shaped members (the upper sheet 7 and the lower sheet 8) can be obtained.

In the example shown in FIG. 1, the sheet set 6 shown includes two metal sheets. However, a sheet set including three or more metal sheets may be used. The uppermost sheet 7 in the sheet set 6 including two or more metal sheets is a steel sheet (high strength steel sheet) containing ultra-high strength steel.

The embodiment of the element 1 of the disclosed embodiments will next be described in detail.

[Screw Thread]

As described above, in the disclosed embodiments, it is important to provide the screw thread 5 on the side surface of the mandrel 2. Preferably, the screw thread 5 has the following shape.

Preferably, the screw thread 5 is disposed in a side surface region of the mandrel 2 in the length direction of the mandrel 2. In this case, the metal sheet used as the upper sheet 7 and the screw thread 5 can form an engagement portion. The number of ridges of the screw thread 5 in the side surface region is preferably in the range of 2 to 20. This allows the formation of the engagement portion. The number of ridges of the screw thread 5 is preferably 3 or more and is preferably 10 or less.

The distance (pitch) between adjacent ridges of the screw thread 5 is preferably in the range of 100 to 1000 μm. The "distance between adjacent ridges of the screw thread" is the distance between ridges adjacent in the length direction of the mandrel 2. If this distance is less than 100 μm, the sheet material is not easily engaged between ridges of the screw thread, and therefore the engagement portion with the metal sheet (the upper sheet 7) cannot be obtained. If the distance exceeds 1000 μm, the area of contact between the element and the metal sheet (the upper sheet 7) in the engagement portion is small, and therefore the above effect cannot be obtained. The distance between adjacent ridges of the screw thread 5 is preferably in the range of 100 to 500 μm.

The inclination angle $\theta_1$ of the screw thread 5 is preferably 10 to 180°. The "inclination angle $\theta_1$ of the screw thread" is the angle of the crest of the screw thread. If the inclination angle $\theta_1$ is less than 10°, the width of the screw thread is small, and the object of the disclosed embodiments is not obtained. If the inclination angle $\theta_1$ exceeds 180°, no screw thread is present, or the ridges and valleys are inverted. The inclination angle $\theta_1$ is preferably 30° or more and is preferably 90° or less.

[Mandrel]

The forward end of the mandrel 2 is formed into the shape described above. In the example shown in FIG. 2, the forward end portion has a tapered shape protruding forward. The angle $\theta_2$ of the tapered shape is preferably 120 to 180°.

[Collar]

As described above, the collar 3 has the function of holding the material of the upper sheet 7 extruded by the plastic flow during the joining process. To obtain this effect, it is necessary that the collar 3 form a space for storing the metal extruded by the plastic flow and press the upper sheet 7. Therefore, as shown in FIG. 2, it is preferable that the collar 3 is formed into an umbrella shape.

[Coating Layer]

The thickness of the coating layer is preferably 1 to 100 μm. If the thickness is less than 1 μm, the coating layer may disappear due to wear, so that the effect of the coating may not be obtained. A thickness of more than 100 μm is not practical from the viewpoint of cost.

The thickness of the coating layer is more preferably 2 μm or more and is more preferably 10 μm or less.

Examples

To further facilitate understanding, the disclosed embodiments will be described by way of the following Examples. However, the following Examples are not intended to limit the technical scope of the disclosed embodiments.

In samples used, 590 MPa-grade high-strength steel, 980 MPa-grade high-strength steel, 1470 MPa-grade high-strength steel, or an A5052 aluminum alloy was used for the upper sheet, and 1180 MPa-grade high-strength steel or 1470 MPa-grade high-strength steel was used for the lower sheet. For sheet sets including three sheets, 980 MPa-grade high-strength steel, 1470 MPa-grade high-strength steel, or an A5052 aluminum alloy was used for the middle sheet.

The "590 MPa-grade" means that the lower limit of the tensile strength is 590 MPa, and the "980 MPa-grade" means that the lower limit of the tensile strength is 980 MPa. The "1180 MPa-grade" means that the lower limit of the tensile strength is 1180 MPa, and the "1470 MPa-grade" means that the lower limit of the tensile strength is 1470 MPa. The thicknesses h (mm) of the samples are shown in Tables 1-1 and 1-2. In the Examples, the sheet sets shown in Tables 1-1 and 1-2 were used.

Two types of elements shown in Table 2 were prepared as elements for joining the above sheet sets. One of them is the element shown in FIG. 1 and including the screw thread disposed on the side surface of the mandrel 2 (the element of the disclosed embodiments). The other one is the element shown in FIG. 3 and including no screw thread on the side surface of the mandrel (the conventional element). In the forward end of the mandrel 2 shown in FIG. 1, the angle $\theta_2$ of the tapered shape was appropriately set within the range of 120 to 180° (see FIG. 2). The "heat-resistant film" in Table 2 is a coating layer that is a heat-resistant coating formed by PVD treatment.

Each of the sheet sets was joined using a joining method known as the friction element welding (FEW) method (see, for example, U.S. Pat. No. 3,477,115). The joining conditions used are shown in Table 2.

The joints obtained by the joining (mechanically joined joints) were used for joint appearance observation and a tensile strength test using the following methods. The results obtained were used to evaluate the joint state according to criteria described below.

<Appearance Observation>

The appearance observation was performed by visually observing each of the joints obtained. Moreover, the joint was cut at the center of its joint portion to obtain a cross section, and the cross section was observed. The appearance of the joint was evaluated as follows. When the element pierced through the upper sheet and was frictionally joined to the lower sheet, the appearance of the joint was rated "good," and the symbol "0" was assigned. In other cases, the appearance of the joint was rated "poor," and the symbol "x" was assigned. The results obtained are shown in Table 2.

<Tensile Strength Test>

In the tensile strength test, each of the joints obtained was used to perform a cross tensile test (JIS Z 3137). The cross tensile test was performed on the joints whose appearance had been rated "good" in the appearance observation. The joint strength (kN) obtained is shown in Table 2.

<Evaluation of Joint State>

The joint state was evaluated using the above results according to the following criteria.

When the rating of the appearance of the joint was mom and the joint strength was "6 kN or more," the joint state was rated "A." When the rating of the appearance of the joint was "○" and the joint strength was "3 kN or more and less than 6 kN," the joint state was rated "B." When the rating of the appearance of the joint was "○" and the joint strength was "less than 3 kN," the joint state was rated "C." When the rating of the appearance of the joint was "x," the joint state was rated "D." The results of the evaluation of the joint state are shown in Table 2.

TABLE 1-1

| Sheet set | Lower sheet | | Upper sheet | |
|---|---|---|---|---|
| | Material | Thickness h (mm) | Material | Thickness h (mm) |
| a | 1470 MPa grade | 1.6 | 980 MPa grade | 1.0 |
| b | 1470 MPa grade | 1.6 | 980 MPa grade | 1.6 |
| c | 1470 MPa grade | 1.6 | 1470 MPa grade | 1.0 |
| d | 1180 MPa grade | 1.6 | 980 MPa grade | 1.0 |
| e | 1470 MPa grade | 1.0 | 980 MPa grade | 1.0 |
| f | 1470 MPa grade | 1.6 | A5052 | 2.0 |

TABLE 1-2

| Sheet set | Lower sheet | | Middle sheet | | Upper sheet | |
|---|---|---|---|---|---|---|
| | Material | Thickness h (mm) | Material | Thickness h (mm) | Material | Thickness h (mm) |
| g | 1470 MPa grade | 1.6 | A5052 | 1.0 | A5052 | 0.5 |
| h | 1470 MPa grade | 1.6 | 980 MPa grade | 0.5 | 590 MPa grade | 0.5 |
| i | 1470 MPa grade | 1.0 | 1470 MPa grade | 0.5 | 980 MPa grade | 0.5 |

TABLE 2

| | | | Element shape | | | | | |
|---|---|---|---|---|---|---|---|---|
| | | | Overall length L of mandrel (mm) | Number of ridges of screw thread (—) | Pitch (μm) | Inclination angle of screw thread $\theta_1$ (°) | Coating | | |
| No. | Sheet set | Element | | | | | Presence of coating | Type | Thickness (μm) |
| 1 | a | FIG. 1 | 4 | 6 | 400 | 60 | Yes | Heat resistant film | 5 |
| 2 | a | FIG. 1 | 4 | 6 | 400 | 60 | No | — | — |
| 3 | a | FIG. 3 | 4 | 6 | 400 | 60 | No | — | — |
| 4 | b | FIG. 1 | 5 | 8 | 400 | 60 | Yes | Heat resistant film | 5 |
| 5 | b | FIG. 3 | 5 | 8 | 400 | 60 | No | — | — |
| 6 | c | FIG. 1 | 4 | 6 | 400 | 60 | Yes | Heat resistant film | 5 |
| 7 | c | FIG. 3 | 4 | 6 | 400 | 60 | No | — | — |
| 8 | d | FIG. 1 | 4 | 6 | 400 | 60 | Yes | Heat resistant film | 5 |
| 9 | d | FIG. 3 | 4 | 6 | 400 | 60 | No | — | — |
| 10 | e | FIG. 1 | 4 | 6 | 400 | 60 | Yes | Heat resistant film | 5 |

TABLE 2-continued

| No. | | | | | | | | | |
|---|---|---|---|---|---|---|---|---|---|
| 11 | e | FIG. 3 | 4 | 6 | 400 | 60 | No | — | — |
| 12 | f | FIG. 1 | 5 | 8 | 400 | 60 | Yes | Heat resistant film | 5 |
| 13 | a | FIG. 1 | 4 | 6 | 400 | 60 | Yes | Heat resistant film | 3 |
| 14 | a | FIG. 1 | 4 | 6 | 400 | 60 | Yes | Heat resistant film | 1 |
| 15 | a | FIG. 1 | 4 | 6 | 400 | 60 | Yes | Heat resistant film | 11 |
| 16 | g | FIG. 1 | 4 | 6 | 400 | 60 | Yes | Heat resistant film | 5 |
| 17 | h | FIG. 1 | 4 | 6 | 400 | 60 | Yes | Heat resistant film | 5 |
| 18 | i | FIG. 1 | 4 | 6 | 400 | 60 | Yes | Heat resistant film | 5 |

| | Joining conditions | | Evaluation | | | |
|---|---|---|---|---|---|---|
| No. | Rotation speed (rpm) | Pressing force (kN) | Appearance of joint*[1] | Joint strength (kN) | Joint state*[2] | Remarks |
| 1 | 6500 | 7 | ○ | 7.4 | A | Example |
| 2 | 6500 | 7 | ○ | 5.3 | B | Example |
| 3 | 6500 | 7 | x | — | D | Comparative Example |
| 4 | 6500 | 7 | ○ | 2.6 | C | Example |
| 5 | 6500 | 7 | x | — | D | Comparative Example |
| 6 | 6500 | 7 | ○ | 5.6 | B | Example |
| 7 | 6500 | 7 | x | — | D | Comparative Example |
| 8 | 6500 | 7 | ○ | 7.2 | A | Example |
| 9 | 6500 | 7 | x | — | D | Comparative Example |
| 10 | 6500 | 7 | ○ | 6.7 | A | Example |
| 11 | 6500 | 7 | x | — | D | Comparative Example |
| 12 | 6500 | 7 | ○ | 1.5 | C | Comparative Example |
| 13 | 6500 | 7 | ○ | 7.4 | A | Example |
| 14 | 6500 | 7 | ○ | 5.3 | B | Example |
| 15 | 6500 | 7 | ○ | 7.4 | A | Example |
| 16 | 6500 | 7 | ○ | 1.5 | C | Comparative Example |
| 17 | 6500 | 7 | ○ | 7.4 | A | Example |
| 18 | 6500 | 7 | ○ | 6.7 | A | Example |

*[1]○: The appearance of the joint was good. x: The appearance of the joint was poor.
*[2]A: The appearance of the joint was "○," and the joint strength was "6 kN or more." B: The appearance of the joint was "○," and the joint strength was "3 kN or more and less than 6 kN." C: The appearance of the joint was "○," and the joint strength was "less than 3 kN." D: The appearance of the joint was "x."

When the joining was performed using the element of the disclosed embodiments, the evaluation of the joint state was one of A to C, and thus, the joint could be formed using mechanical joining. The joints obtained (except for Nos. 12 and 16 in Table 2) were found to have good joint performance. However, when the conventional element was used for joining, the evaluation of the joint state was D in all the cases, and thus, the joint could not be formed by mechanical joining.

As shown in Table 2, in all the Examples, the joint state was good, and the joint strength was 2.6 kN or more. However, in joints Nos. 12 and 16 (Comparative Examples), although the appearance evaluation of the joint was good "○," since the upper sheet was the aluminum alloy sheet, the wear of the element during insertion into the upper sheet was significant, and the joint diameter was not sufficient. Therefore, the joint strength was as low as 1.5 kN. In the Comparative Examples outside the ranges of the disclosed embodiments, the joint state was poor (the joint appearance in Table 2 was represented by the symbol "x").

The invention claimed is:

1. A friction joining element for mechanically joining a sheet set prepared by stacking two or more metal sheets including a high strength steel sheet as an upper sheet, the friction joining element comprising:
    a mandrel having an overall length adjusted to be equal to or less than a total thickness of the sheet set;
    a collar disposed at an upper portion of the mandrel, the collar having an umbrella shape; and
    a screw thread disposed on a side surface of a head-side portion of the mandrel, wherein:
        the screw thread includes a plurality of ridges formed continuously in a length direction of the mandrel,
        a plurality of ridges of the screw thread in a side surface region of the mandrel is from 2 to 20 inclusive,
        a distance between adjacent ridges of the plurality of ridges is in a range of 100 to 500 μm;
        an inclination angle of the screw thread is between 1° and 180°, and
        a forward end portion of the mandrel has a tapered shape protruding forward with an angle of the tapered shape being between 120 and 180°.

2. The friction joining element according to claim 1, wherein a coating layer is provided on a surface of the screw thread.

* * * * *